(12) United States Patent
So

(10) Patent No.: US 7,293,502 B2
(45) Date of Patent: Nov. 13, 2007

(54) FOOD MASHER

(76) Inventor: Kwok Kuen So, 2nd Floor, Chuan Yuan Factory Building, 342-344 Kwun Tong Road, Kwun Tong, Kowloon, Hong Kong SAR (CN)

( * ) Notice: Subject to any disclaimer, the term of this patent is extended or adjusted under 35 U.S.C. 154(b) by 189 days.

(21) Appl. No.: 11/144,596

(22) Filed: Jun. 6, 2005

(65) Prior Publication Data
US 2006/0289687 A1 Dec. 28, 2006

(51) Int. Cl.
B30B 7/00 (2006.01)
B30B 9/06 (2006.01)
A47J 19/04 (2006.01)

(52) U.S. Cl. ........................ 100/234; 100/126; 100/243; 99/495; 99/506; D7/666; 241/169; 241/169.2

(58) Field of Classification Search ................ 100/104, 100/110, 116, 125, 126, 132, 234, 243; 99/495, 99/506–511; 241/169, 169.2; D7/665, 666, D7/680; 220/324, 326; 206/503, 509; 24/DIG. 56, 24/DIG. 58, 499
See application file for complete search history.

(56) References Cited

U.S. PATENT DOCUMENTS

| | | | | |
|---|---|---|---|---|
| 256,372 A | * | 4/1882 | Rex | .................... 100/229 R |
| 587,860 A | * | 8/1897 | Redmon | .................... 100/98 R |
| 952,519 A | * | 3/1910 | Gilchrist | .................... 100/234 |
| 1,088,123 A | * | 2/1914 | Gilchrist | .................... 100/245 |
| 3,786,999 A | | 1/1974 | Cabell | |
| 4,714,205 A | | 12/1987 | Steinko | |
| 5,823,483 A | * | 10/1998 | Gaskill | .................... 248/37.6 |
| 6,196,122 B1 | * | 3/2001 | Lai | .................... 99/495 |
| 6,715,706 B1 | | 4/2004 | Planca et al. | |
| 2004/0103797 A1 | | 6/2004 | Repac et al. | |

FOREIGN PATENT DOCUMENTS

| | | |
|---|---|---|
| BE | 537984 | 5/1955 |
| DE | 164701 | * 7/1904 |
| DE | 3400897 A1 | * 7/1985 |
| FR | 614 257 | 12/1926 |
| FR | 1 081 065 | 12/1954 |

* cited by examiner

Primary Examiner—Jimmy Nguyen
(74) Attorney, Agent, or Firm—Leydig, Voit & Mayer, Ltd.

(57) ABSTRACT

A food masher includes a support frame having an opening, a hopper having a perforated floor, received detachably by the support frame within the opening, a handle extending from the support frame, a lever extending pivotally from the support frame, and a plunger attached to the lever and extending into the hopper.

20 Claims, 7 Drawing Sheets

FOOD MASHER

The present invention relates to a food masher or pulpifier.

BACKGROUND OF THE INVENTION

More particularly, although not exclusively, the invention relates to a handheld device which can be used to mash vegetables such as potatoes, pumpkins, sweet potatoes and butternuts.

It is known to provide handheld vegetable mashers comprising a cup-shaped receptacle having a perforated floor and a lever-activated plunger for pushing the soft vegetables against the floor to force extrusion of pulped vegetable material through the perforations.

Such devices are limited to having perforations of a fixed size which may not be suitable for a wide range of vegetables, and are difficult to clean thoroughly.

OBJECTS OF THE INVENTION

It is an object of the present invention to overcome or substantially ameliorate the above disadvantages and/or more generally to provide an improved food masher.

SUMMARY OF THE INVENTION

According to the invention, there is provided a food masher comprising:
- a support frame having an opening;
- a hopper having a perforated floor, received detachably by the support frame within the opening;
- a handle extending from the support frame;
- a lever extending pivotally from the support frame; and
- a plunger attached to the lever and extending into the hopper.

Preferably, the support frame comprises a slot at the opening and the hopper has an external tab received by the slot.

More preferably, the slot is L-shaped so as to cooperate with the tab in bayonet fashion as the hopper is inserted into the support frame.

It is preferred that the food masher further comprises a locking mechanism upon the support frame which prevents rotation of the hopper within the opening.

Preferably, the locking mechanism comprises a sliding latch and a spring biasing the latch into the opening for engagement with the hopper, and an activation button extending from the latch through an opening of the handle.

In a specific construction, the hopper comprises a wall to which the floor is threadedly attached.

Preferably, the wall comprises external thread, and further comprising a retaining ring having internal thread engaging the external thread.

More preferably, the retaining ring comprises an internal flange that bears upon the perforated floor to retain the perforated floor against the wall.

It is preferred that the plunger is attached pivotally to the lever.

In a specific construction that the food masher further comprises a leg extending from the support frame diametrically opposite the handle, so that both the leg and handle can be placed upon an opening of the cooking hopper to support the masher thereon.

Preferably, the leg comprises a lip and a spring-loaded tongue bearing toward the lip so that the tongue and lip clamp to the cooking hopper alongside its opening.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
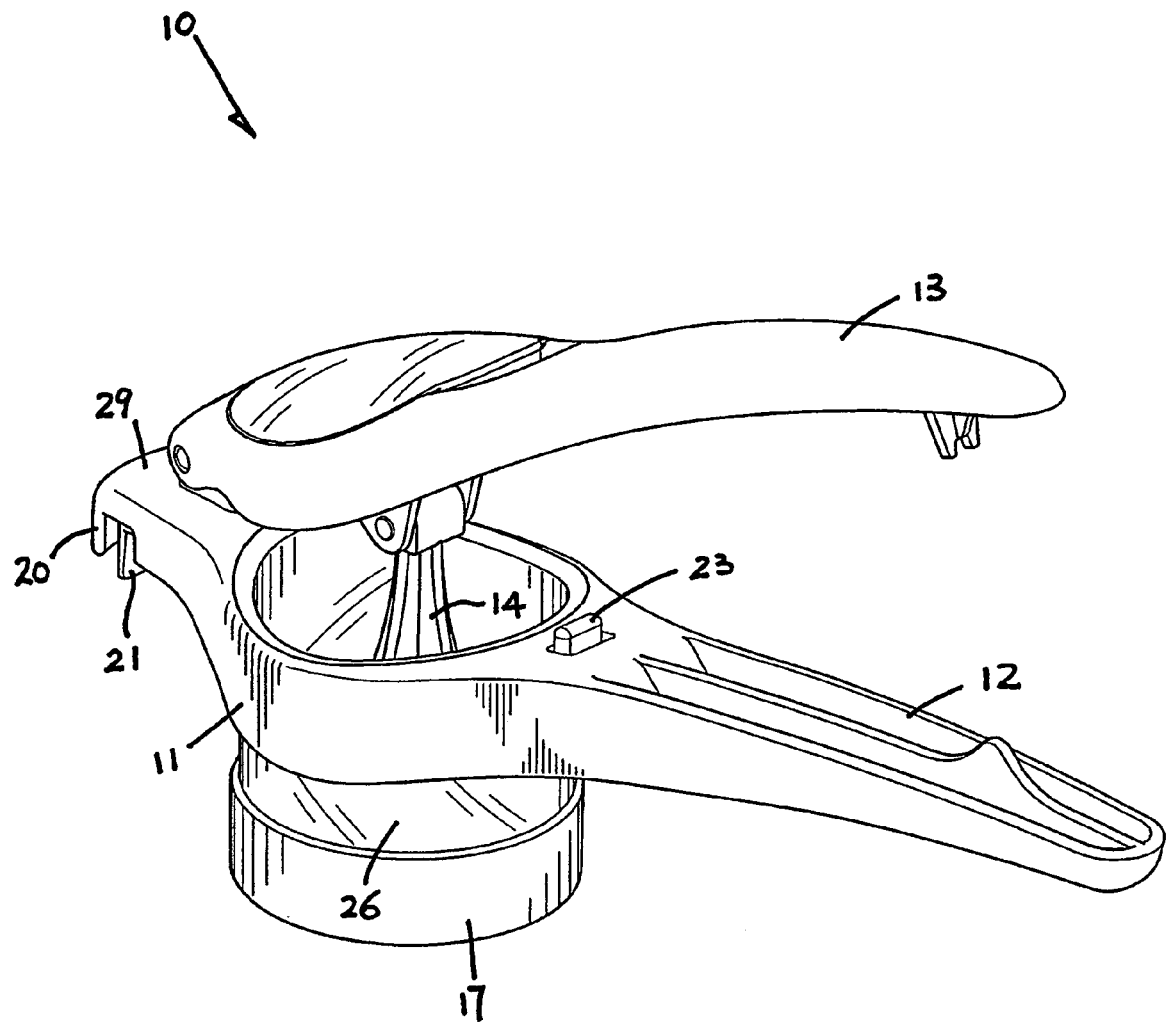
FIG. 1 is a perspective view of a handheld food masher in accordance with the invention.
Figure 2:
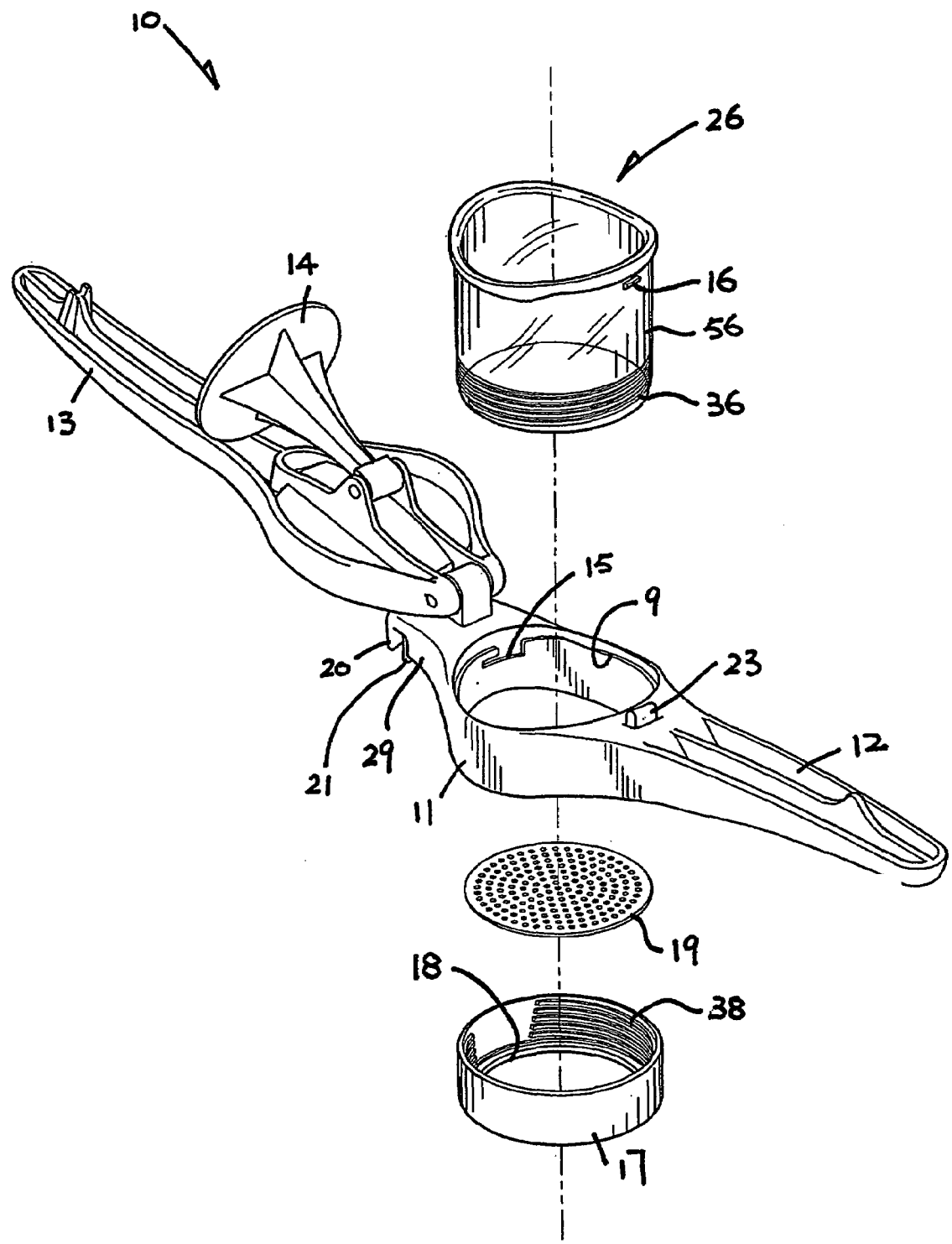
FIG. 2 is a parts-exploded perspective view of the food masher of FIG. 1.
Figure 3:
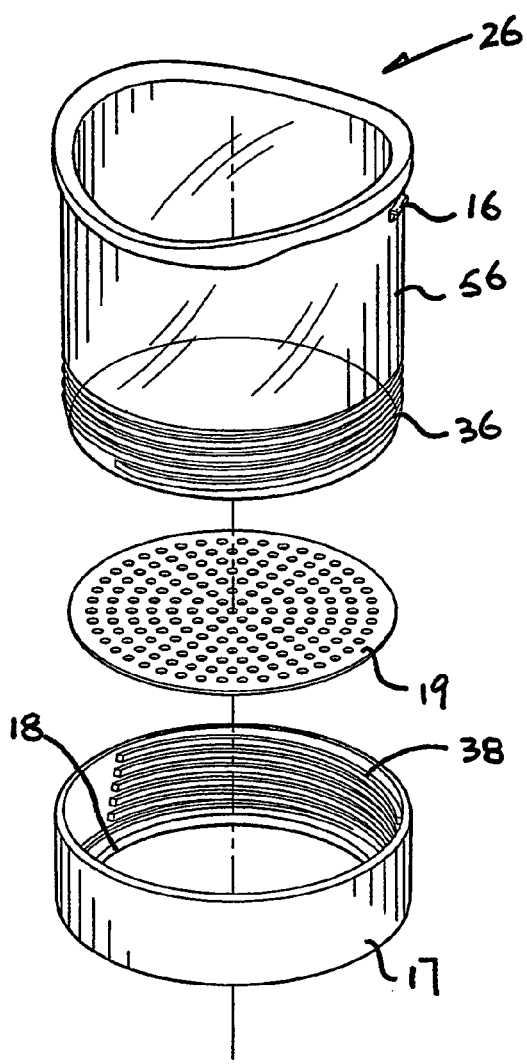
FIG. 3 is a parts-exploded perspective view of a hopper of the masher of FIG. 1.
Figure 4:
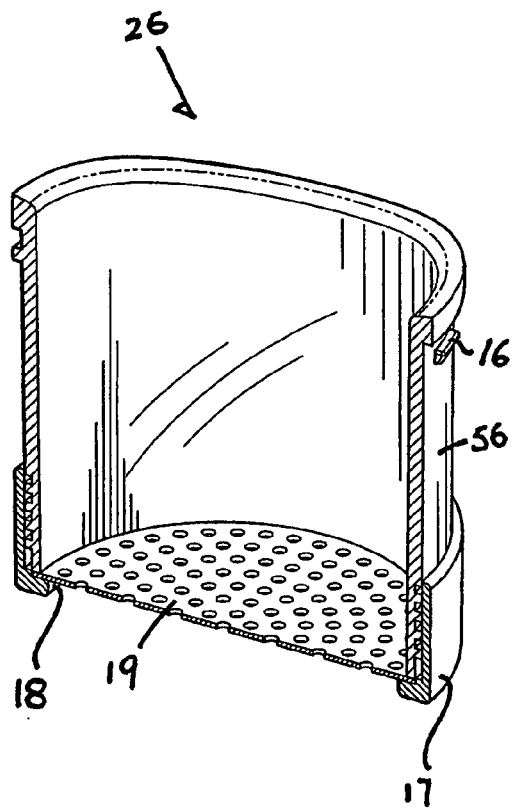
FIG. 4 is a cross-sectional perspective view of the hopper of FIG. 3.
Figure 5:
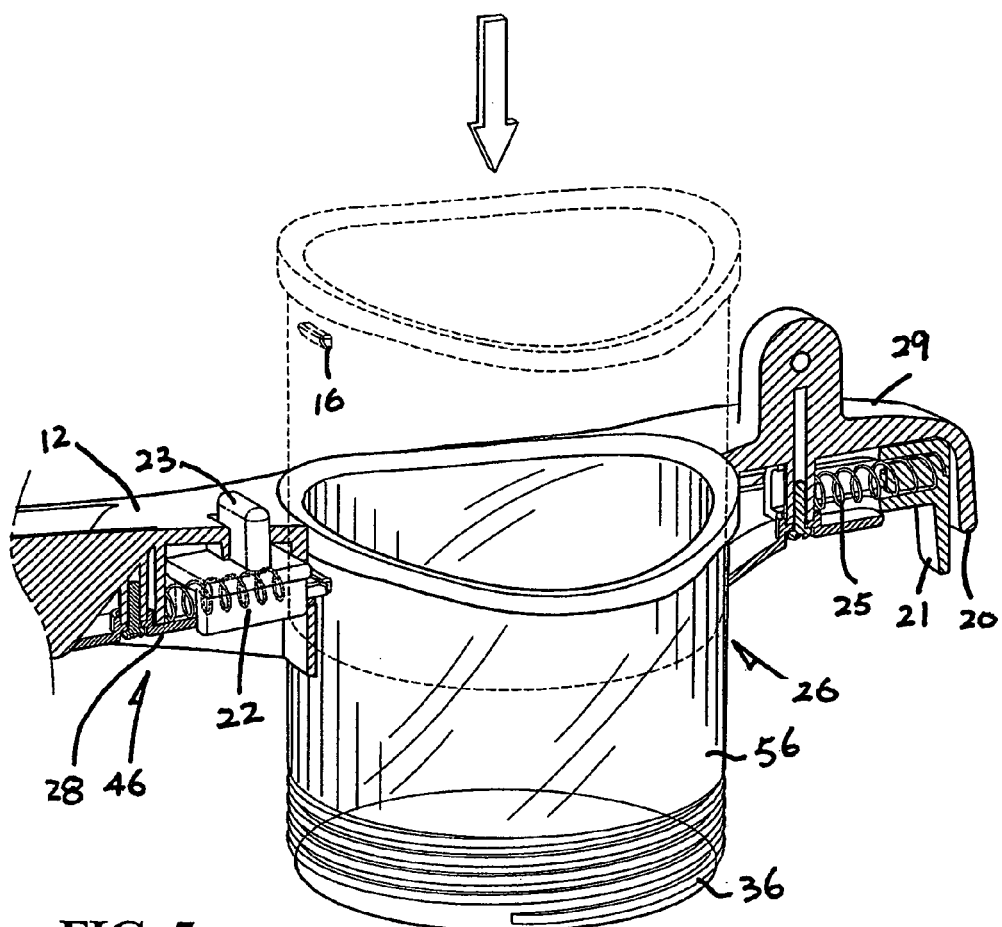
FIG. 5 is a cross-sectional perspective view of a support frame and a hopper wall of the masher of FIG. 1, in an unlocked configuration.

Referring to the drawings, there is shown a vegetable masher 10 which would typically comprise metal and/or moulded plastics parts. The masher 10 includes a support frame 11 having a handle 12 extending therefrom. Attached pivotally to the support frame 11 is a lever 13 to which a plunger 14 is pivotally attached.

The support frame 11 comprises a circular opening 9 into which a hopper 26 is received. The hopper 26 has a cylindrical hopper wall 56, from which a pair of diametrically opposed tabs 16 extend. The opposed tabs 16 are received by L-shaped slots 15 inside the opening 9 at the frame 11.

The hopper 26 has external thread 36 at the bottom of its wall 56 to which there is engaged a retaining ring 17 having internal thread 38 and an annular flange 18 that retains a perforated floor 19 against the bottom of the wall 56.

Opposite the handle 12, there is provided a support leg 29, which together with the handle 12 serves to support the masher 10 upon an upper rim of a cooking hopper or bowl for example. The leg 29 comprises a lip 20 at its distal end. Within the leg 29, there is provided a tongue 21 that is forced toward the lip 20 by a spring 25. The tongue 21 and lip 20 act as the clamp by which the leg 29 can be attached securely to the upper rim of the cooking hopper or bowl.

As can be seen from the figures, the L-shaped nature of the slots 15 allows for bayonet-type inter-engagement of the hopper 26 with the support frame 11.

A locking mechanism 46 is employed to prevent the hopper 26 from being inadvertently rotated and thereby removed from the support frame 11. The locking mechanism 46 comprises a sliding latch 22 that is mounted within the handle 12 to slide diametrically. The latch 22 is spring-biased by a coil spring 24 toward the hopper 26. The latch 22 is retained in position by a retaining plate 28 that is screw-fixed to the handle 12. A pushbutton 23 extends upwardly from the latch 22 through an aperture 27. The aperture 27 is sized to enable sliding movement of the pushbutton 23 together with the latch 22 in a direction away from the hopper 26 for unlocking purposes.

Figure 6:
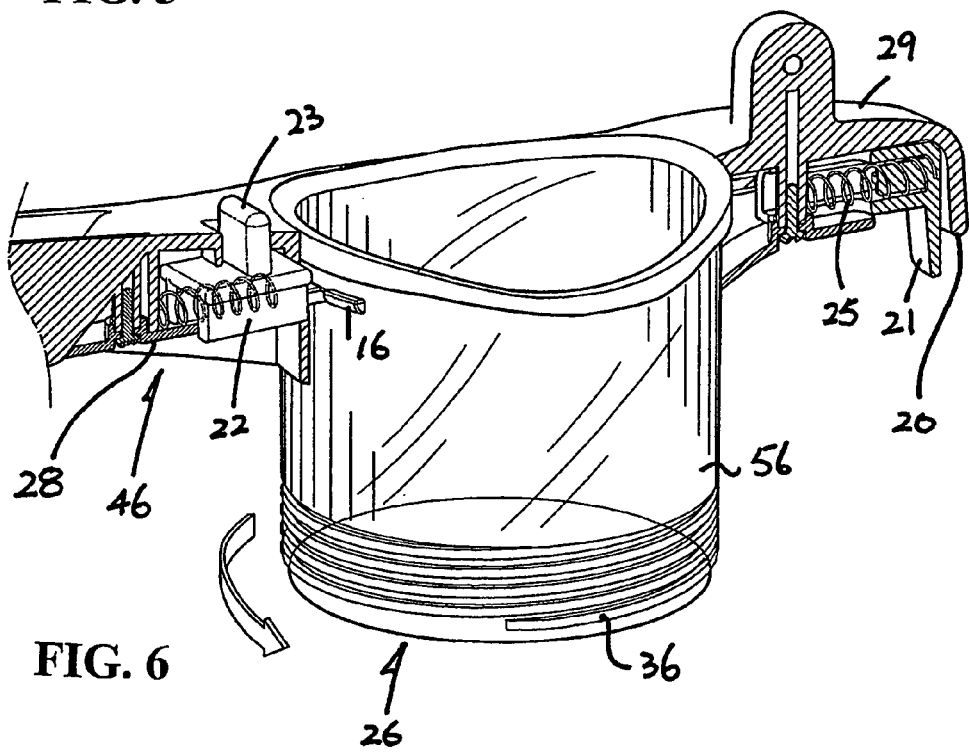
FIG. 6 is a cross-sectional perspective view of the support frame and the hopper wall of FIG. 5, in a locked configuration.
Figure 7:
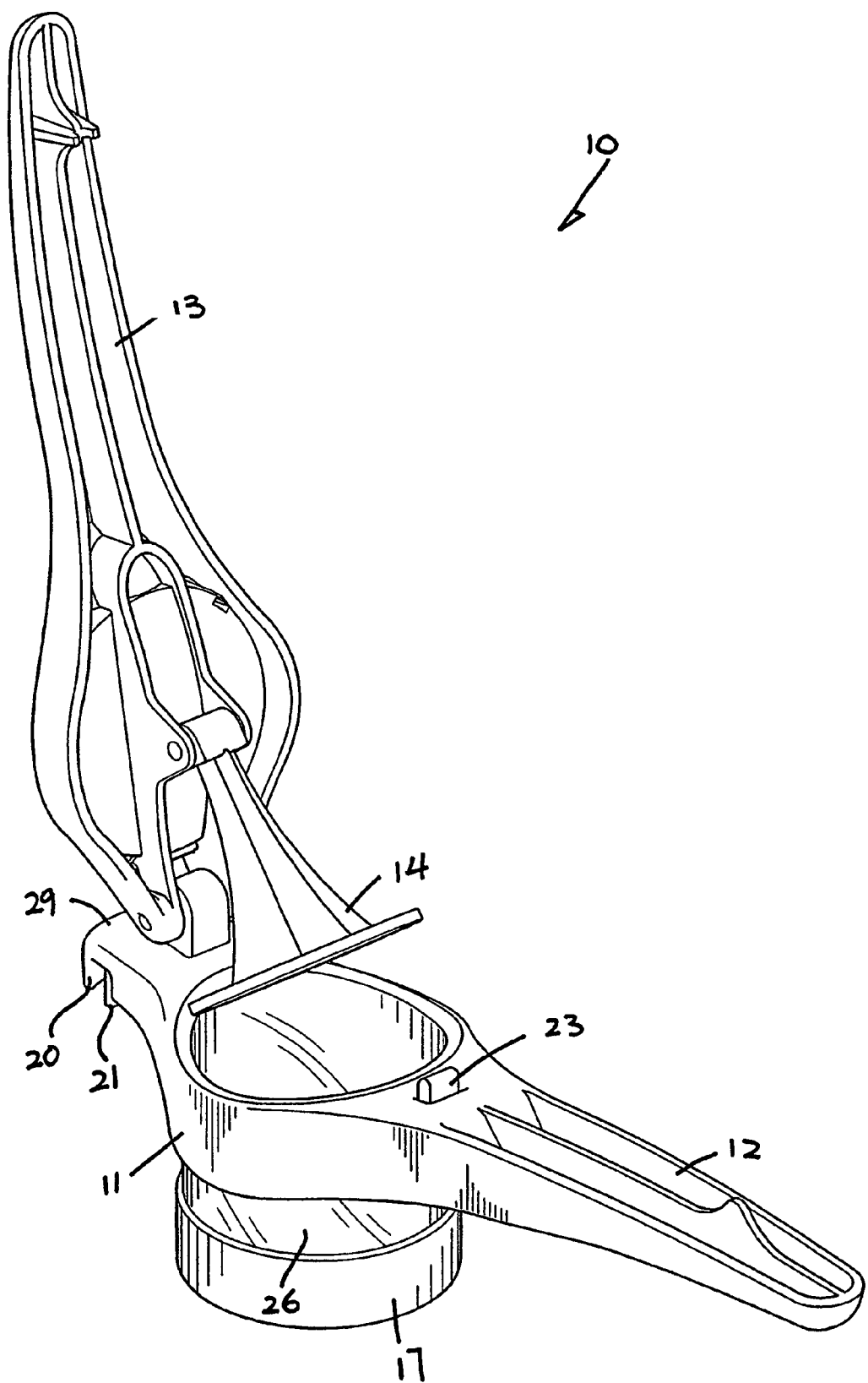
FIG. 7 is a perspective view of the masher of FIG. 1 in an open configuration.
Figure 8:
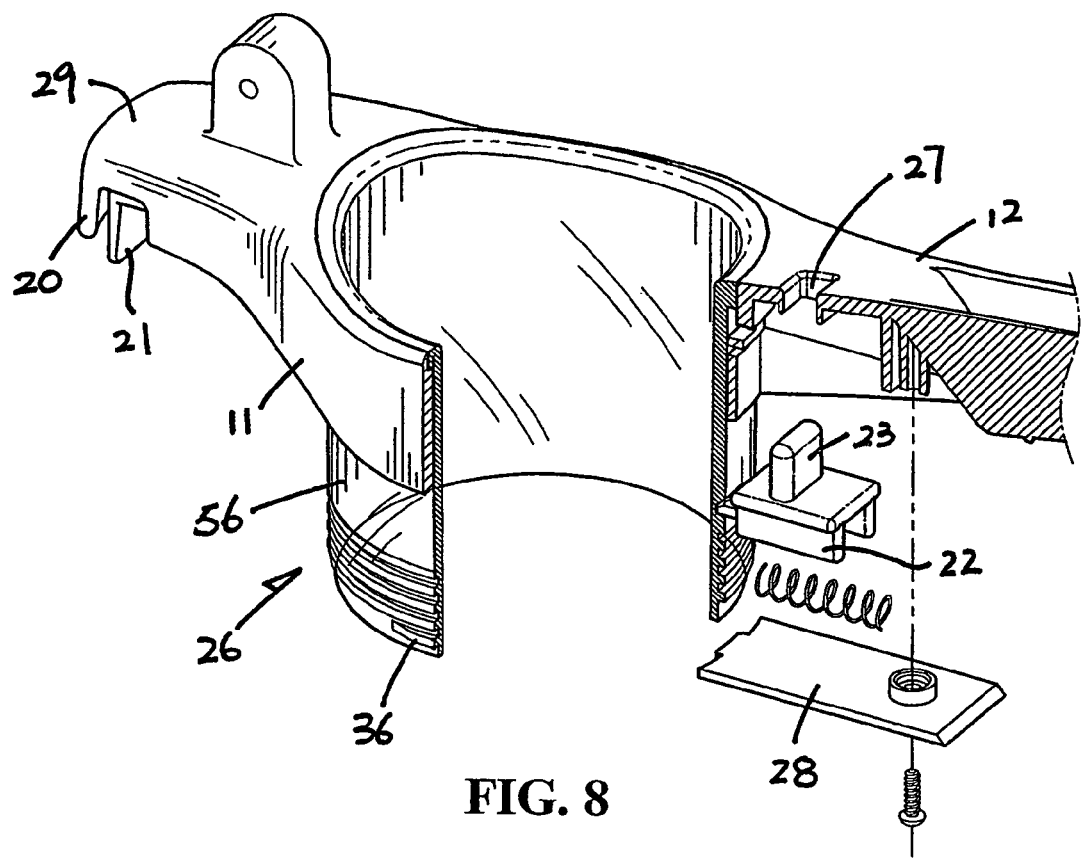
FIG. 8 is a cross-sectional, parts-exploded perspective view of the support frame and the hopper of the masher of FIG. 7, showing its locking mechanism.
Figure 9:
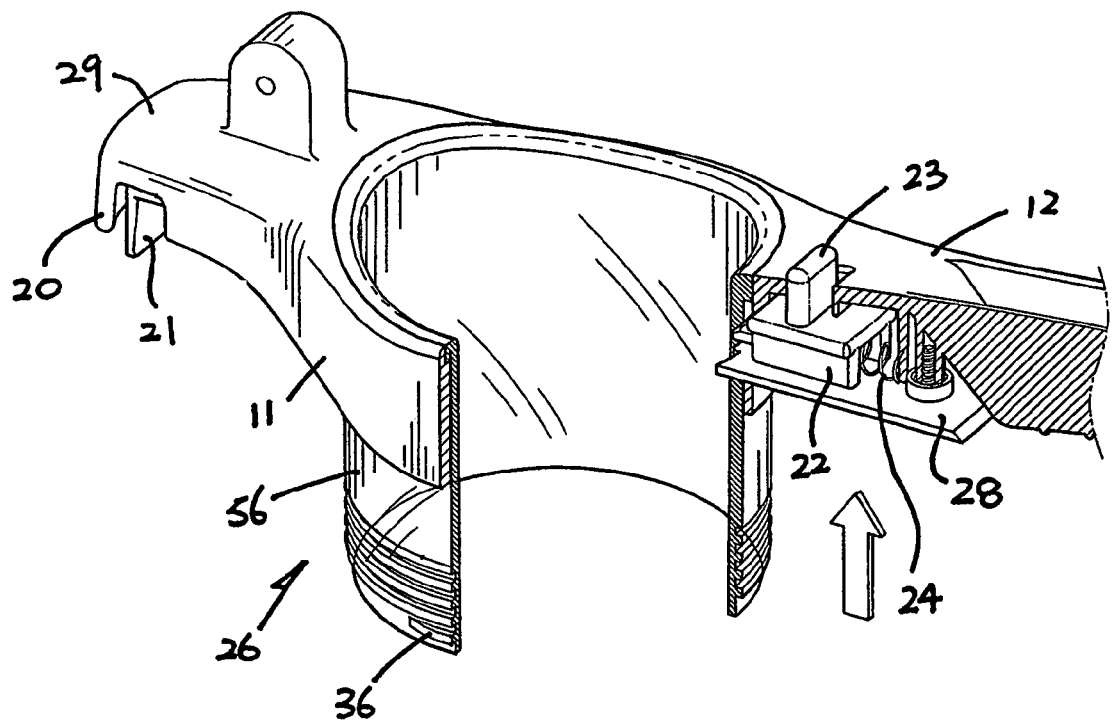
FIG. 9 is a cross-sectional perspective view of the support frame and the hopper of FIG. 8, showing its locking mechanism.
Figure 10:
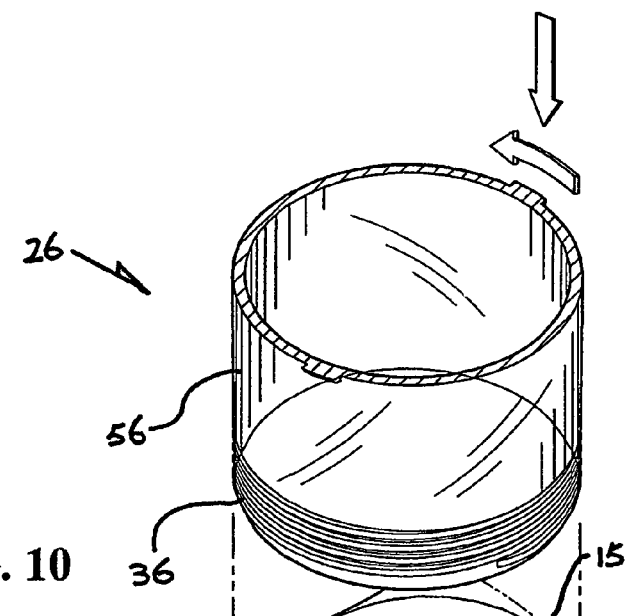
FIG. 10 is a perspective view of the support frame and the hopper wall detached of FIG. 5, showing bayonet connection features.
Figure 11:
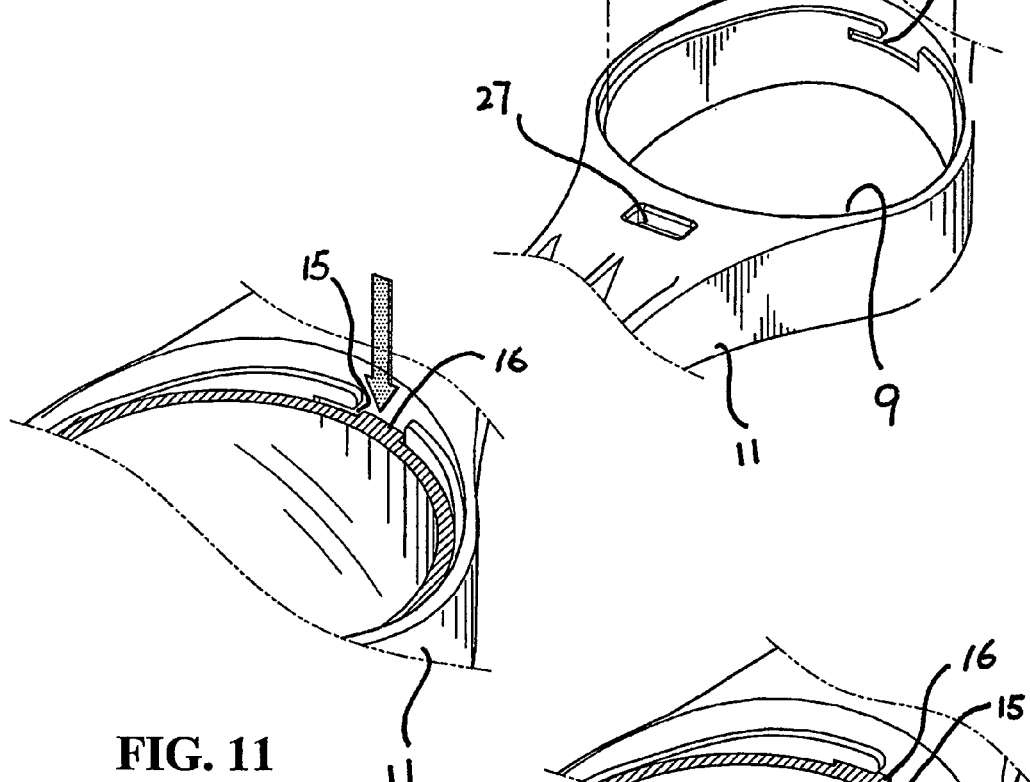
FIG. 11 is a perspective view similar to FIG. 10, showing the hopper wall attached to the support frame of FIG. 5.
Figure 12:
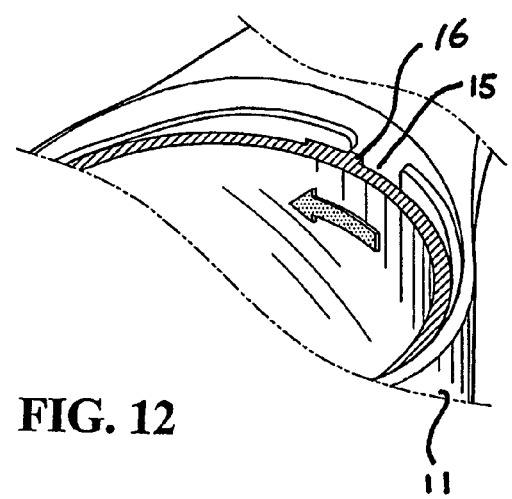
FIG. 12 is a perspective view similar to FIG. 11, showing a subsequent step in the sequence of bayonet connection between the support frame and the hopper wall of FIG. 5.

In the locked position, the latch 22 prevents movement of the tab 16 as shown in FIG. 6.

In use, the perforated floor 19 is attached to the bottom of the hopper 26 using the retaining ring 17 and soft vegetable (or other food) material is inserted into the hopper 26. The hopper 26 is then bayonet-fixed within the support frame 11 so that the plunger 14 can be inserted into the hopper 26 and depressed upon activation of lever 13 toward handle 12. During bayonet-fixing, the latch 22 clicks past the tab 16. The masher 10 can be clamped upon the cooking hopper or bowl by simply pressing the tongue 21 against its upper rim so that the lip 20 clicks over the upper rim after which the spring 25 presses the tongue 21 toward the lip 20 to clamp the masher 10 in place.

After use, the pushbutton 23 is pulled back by thumb-force away from the hopper 26 so that the latch 22 clears the path for tab 16 to enable rotation of the hopper 26 for lifting out of the support frame 11.

It should be appreciated that modifications and alterations obvious to those skilled in the art are not to be considered as beyond the scope of the present invention. For example, rather than the L-shaped bayonet slots 15, the hopper 26 might simply slot downwardly into vertical slots 15 in the locking mechanism 46 might comprise a latch 22 that extends into a recess upon the outer surface of being hopper 26.

The invention claimed is:

1. A food masher comprising:
   a support frame having an opening;
   a hopper having a perforated floor, the hopper being detachably mountable within the opening in the support frame;
   a handle extending from the support frame;
   a lever extending from the support frame and pivoting with respect to the support frame;
   a plunger attached to the lever and extending into the hopper; and
   a locking mechanism mounted within the support frame for preventing rotation of the hopper when the hopper is received within the opening of the support frame, the locking mechanism including
      a sliding latch,
      a spring biasing the latch toward the opening for engagement with the hopper, and
      an activation button extending from the latch and through an opening in the handle for releasing the latch.

2. The food masher as claimed in claim 1, wherein the support frame comprises a slot at the opening and the hopper has an external tab received by the slot.

3. The food masher as claimed in claim 2, wherein The slot is L-shaped for receiving and cooperating with the tab for bayonet connection of the hopper to the support frame.

4. The food masher as claimed in claim 1, wherein the hopper comprises a tubular wall to which the perforated floor is selectively attachable.

5. The food masher as claimed in claim 4, wherein the tubular wall comprises an external thread and the hopper further comprises a retaining ring having an internal thread for engaging the external thread and selectively mounting the perforated floor to the tubular wall.

6. The food masher as claimed in claim 5, wherein the retaining ring comprises an internal flange that bears upon the perforated floor to retain the perforated floor against the tabular wall.

7. The food masher as claimed in claim 1, wherein the plunger is attached pivotally to the lever.

8. The food masher as claimed in claim 1, further comprising a leg extending from the support frame diametrically opposite the handle, so that both the leg and the handle can be placed upon a wall of a vessel to support the food masher on the vessel.

9. The food masher as claimed in claim 8, wherein the leg comprises a lip and a spring-loaded tongue biased toward the lip so that the tongue and lip can clamp the food masher to the wall of the vessel.

10. A food masher comprising:
    a support frame having an opening and including within the support frame an U-shaped slot;
    a hopper having a perforated floor, the hopper being detachably mountable within the opening in the support frame, and having an external projecting tab received in and cooperating with the slot for bayonet connection of the hopper to the support frame;
    a handle extending from the support frame;
    a lever extending from the support frame and pivoting with respect to the support frame;
    a plunger attached to the lever and extending into the hopper; and
    a locking mechanism for preventing rotation of the hopper within the opening when the hopper is received within the opening and mounted to the support frame, the locking mechanism including
       a latch sliding within the handle,
       a spring biasing the latch toward the opening, wherein the latch includes a projection for engaging the external projecting tab to prevent rotation of the hopper when the hopper is mounted to the support frame, and
       a button extending from the latch and through an opening in the handle, for sliding the latch away from the opening, against the bias of the spring, for releasing the latch and permitting rotation of the hopper within the opening.

11. The food masher as claimed in claim 10, wherein the hopper comprises a tubular wall to which the perforated floor is selectively attachable.

12. The food masher as claimed in claim 11, wherein the tubular wall comprises an external thread and the hopper further comprises a retaining ring having an internal thread for engaging the external thread and selectively mounting the perforated floor to the tubular wall.

13. The food masher as claimed in claim 12, wherein the retaining ring comprises an internal flange that bears upon the perforated floor to retain the perforated floor against the tubular wall.

14. The food masher as claimed in claim 10, wherein the plunger is attached pivotally to the lever.

15. The food masher as claimed in claim 10, further comprising a leg extending from the support frame diametrically opposite the handle, so that both the leg and the handle can be placed upon a wail of a vessel to support the food masher on the vessel.

16. The food masher as claimed in claim 15, wherein the leg comprises a lip and a spring-loaded tongue biased toward the lip so that the tongue and lip can clamp the food masher to the wall of the vessel.

17. A food masher comprising:
a support frame having an opening;
a hopper having a perforated floor, the hopper being detachably mountable within the opening in the support frame;
a handle extending from a first side of the support frame;
a leg extending from a second side of the support frame, diametrically opposite the first side of the support frame, so that the food masher can be placed upon a wall of a vessel to support the food masher;
a lever extending from the leg and pivoting with respect to the leg;
a plunger attached to the lever and extending into the hopper;
a lip at a distal end of the leg, transverse to the leg;
a tongue slidably mounted within the leg between the lip and the support frame and including a first portion generally transverse to the leg and a second portion generally parallel to the leg; and
a spring is positioned within the leg for biasing the tongue toward the lip so that the first portion of the tongue and lip can clamp the wall of the vessel supporting the food masher.

18. The food masher as claimed in claim 17, wherein the hopper comprises a tubular wall to which the perforated floor is selectively attachable.

19. The food masher as claimed in claim 18, wherein the tubular wall comprises an external thread and the hopper further comprises a retaining ring having an internal thread for engaging the external thread and selectively mounting the perforated floor to the tubular wall.

20. The food masher as claimed in claim 19, wherein the retaining ring comprises an internal flange that bears upon the perforated floor to retain the perforated floor against the tubular wall.

* * * * *